US008394897B2

(12) United States Patent
Stokes

(10) Patent No.: US 8,394,897 B2
(45) Date of Patent: Mar. 12, 2013

(54) PRODUCTION OF VINYLIDENE-TERMINATED POLYOLEFINS VIA QUENCHING WITH MONOSULFIDES

(75) Inventor: Casey D. Stokes, Novato, CA (US)

(73) Assignee: Chevron Oronite Company LLC, San Ramon, CA (US)

( * ) Notice: Subject to any disclaimer, the term of this patent is extended or adjusted under 35 U.S.C. 154(b) by 360 days.

(21) Appl. No.: 12/055,281

(22) Filed: Mar. 25, 2008

(65) Prior Publication Data

US 2009/0247716 A1     Oct. 1, 2009

(51) Int. Cl.
*C08F 8/26* (2006.01)
*C08F 8/34* (2006.01)
*C08F 8/04* (2006.01)

(52) U.S. Cl. ......... 525/343; 526/85; 526/82; 525/331.9; 525/333.1; 525/333.2; 525/346; 525/360; 525/370; 525/371; 568/38; 568/59; 568/60

(58) Field of Classification Search .................... 526/82, 526/85; 525/331.9, 333.1, 333.2, 343, 346, 525/360, 370, 371; 568/38, 59, 60
See application file for complete search history.

(56) References Cited

U.S. PATENT DOCUMENTS

| | | | |
|---|---|---|---|
| 3,155,686 A | 11/1964 | Prill et al. | |
| 3,632,600 A | 1/1972 | Morris et al. | |
| 4,034,038 A | 7/1977 | Vogel | |
| 4,152,499 A | 5/1979 | Boerzel et al. | |
| 4,238,628 A | 12/1980 | Cahill et al. | |
| 4,255,538 A | 3/1981 | Skillicorn | |
| 4,276,394 A | 6/1981 | Kennedy et al. | |
| 4,342,849 A | 8/1982 | Kennedy | |
| 4,393,199 A | 7/1983 | Manser | |
| 4,468,291 A | 8/1984 | Naarmann et al. | |
| 4,486,572 A | 12/1984 | Kennedy | |
| 4,568,732 A | 2/1986 | Kennedy et al. | |
| 4,758,631 A | 7/1988 | Kennedy et al. | |
| 4,814,405 A | 3/1989 | Kennedy | |
| 4,910,321 A | 3/1990 | Kennedy et al. | |
| 4,929,683 A | 5/1990 | Kennedy et al. | |
| 4,943,616 A | 7/1990 | Mishra et al. | |
| 4,946,899 A | 8/1990 | Kennedy et al. | |
| 4,948,936 A | 8/1990 | Landry | |
| 5,032,653 A | 7/1991 | Cheradame et al. | |
| 5,066,730 A | 11/1991 | Kennedy et al. | |
| 5,112,507 A | 5/1992 | Harrison | |
| 5,122,572 A | 6/1992 | Kennedy et al. | |
| 5,169,914 A | 12/1992 | Kaszas et al. | |
| 5,175,225 A | 12/1992 | Ruhe, Jr. | |
| 5,219,948 A | 6/1993 | Storey et al. | |
| 5,225,492 A | 7/1993 | Kennedy et al. | |
| 5,286,823 A | 2/1994 | Rath | |
| 5,300,701 A | 4/1994 | Cherpeck | |
| 5,334,321 A | 8/1994 | Harrison et al. | |
| 5,336,745 A | 8/1994 | Cheradame et al. | |
| 5,340,881 A | 8/1994 | Kennedy et al. | |
| 5,350,786 A | 9/1994 | Costanzi et al. | |
| 5,350,819 A | 9/1994 | Shaffer | |
| 5,366,745 A | 11/1994 | Daden | |
| 5,395,885 A | 3/1995 | Kennedy et al. | |
| 5,428,111 A | 6/1995 | Faust et al. | |
| 5,444,135 A | 8/1995 | Cheradame et al. | |
| 5,448,000 A | 9/1995 | Gullapalli et al. | |
| 5,451,647 A | 9/1995 | Faust et al. | |
| 5,464,549 A | 11/1995 | Sieberth | |
| 5,488,000 A | 1/1996 | Zhang et al. | |
| 5,506,316 A | 4/1996 | Shaffer | |
| 5,580,935 A | 12/1996 | Shaffer | |
| 5,616,668 A | 4/1997 | Harrison et al. | |
| 5,629,394 A | 5/1997 | Cheradame et al. | |
| 5,637,647 A | 6/1997 | Faust et al. | |
| 5,663,457 A | 9/1997 | Kolp | |
| 5,663,470 A | 9/1997 | Chen et al. | |
| 5,677,386 A | 10/1997 | Faust et al. | |
| 5,690,861 A | 11/1997 | Faust | |
| 5,777,044 A | 7/1998 | Faust | |
| 5,945,491 A | 8/1999 | Matyjaszewski et al. | |
| 5,948,936 A | 9/1999 | Itoh et al. | |
| 6,033,446 A | 3/2000 | Cherpeck et al. | |
| 6,194,597 B1 | 2/2001 | Faust et al. | |
| 6,407,066 B1 | 6/2002 | Dressen et al. | |
| 6,451,920 B1 | 9/2002 | Harrison et al. | |

(Continued)

FOREIGN PATENT DOCUMENTS

| | | |
|---|---|---|
| DE | 237072 | 7/1986 |
| DE | 240308 | 10/1986 |

(Continued)

OTHER PUBLICATIONS

Over Simison, End-Quenching of Quasiliving Carbocationic Isobutylene Polymerization with Hindered Bases: Quantitative Formation of exo-Olefin-Terminated Polyisobutylene, Macromolecules, 2006, 39, 2481-2487.*

DePuy, Electronic Effects in Elimination Reactions. V. The E2 Reaction of b-Phenylehtyl Fluorides and Chlroides, J. Am. Chem. Soc., 1960, 82, (10), 2535-3537.*

Bae et al., "The Role of Pyridine Derivatives in Living Carbocationic Polymerization: Lewis Base or Nucleophile", Macromol, Symp. vol. 132, 11-23, 1998.

Bae et al., Y. C. and Faust, R., "B-Proton Elimination by Free Bases in the Living Carbocationic Polymerization of Isobutylene", Macromolecules, 30, 7341-7344, 1997, vol. 30, No. 23, J. American Chemical Society.

(Continued)

*Primary Examiner* — Robert C Boyle
(74) *Attorney, Agent, or Firm* — Jones Day

(57) ABSTRACT

Provided herein are methods for a vinylidene terminated polyolefin comprising:
    a. ionizing a polyolefin in the presence of a Lewis acid to form an ionized polyolefin;
    b. reacting the ionized polyolefin from step (a) with one or more dihydrocarbylmonosulfides; and
    c. reacting the product of step (b) with one or more proton acceptor compounds.

In some embodiments, the dihydrocarbylmonosulfide has the formula:

$$R_1-S-R_2$$

wherein $R_1$ and $R_2$ are each, independently, hydrocarbyl.

44 Claims, No Drawings

U.S. PATENT DOCUMENTS

| | | | |
|---|---|---|---|
| 6,468,948 B1 | 10/2002 | Rossi et al. | |
| 6,515,083 B2 | 2/2003 | Ozawa et al. | |
| 6,642,318 B1 | 11/2003 | Chiefari et al. | |
| 6,753,391 B1 | 6/2004 | Lewandowski et al. | |
| 6,818,716 B2 | 11/2004 | Wendland et al. | |
| 6,906,011 B2 | 6/2005 | Harrison et al. | |
| 6,969,744 B2 | 11/2005 | Stokes et al. | |
| 7,071,275 B2 | 7/2006 | Rath et al. | |
| 7,124,110 B1 | 10/2006 | Kemp, II et al. | |
| 7,244,870 B2 | 7/2007 | Lange et al. | |
| 7,420,019 B2 | 9/2008 | Stokes | |
| 7,501,476 B2 | 3/2009 | Stokes | |
| 7,576,161 B2 | 8/2009 | Stokes | |
| 7,705,090 B2 | 4/2010 | Stokes | |
| 7,709,580 B2 | 5/2010 | Stokes | |
| 7,816,459 B2 | 10/2010 | Stokes | |
| 2002/0082367 A1 | 6/2002 | McConville et al. | |
| 2002/0132905 A1 | 9/2002 | Babinee et al. | |
| 2003/0105194 A1 | 6/2003 | Suart et al. | |
| 2003/0162858 A1 | 8/2003 | Faust et al. | |
| 2003/0191257 A1 | 10/2003 | Wettling et al. | |
| 2004/0015029 A1* | 1/2004 | Lange et al. | 585/521 |
| 2004/0260033 A1 | 12/2004 | Stokes et al. | |
| 2005/0282972 A1 | 12/2005 | Stokes et al. | |
| 2006/0041081 A1 | 2/2006 | Stokes et al. | |
| 2006/0041083 A1 | 2/2006 | Stokes et al. | |
| 2006/0041084 A1* | 2/2006 | Stokes et al. | 525/375 |
| 2006/0135721 A1 | 6/2006 | Lange et al. | |
| 2006/0264577 A1 | 11/2006 | Faust et al. | |
| 2007/0155908 A1 | 7/2007 | Stokes et al. | |
| 2007/0155910 A1 | 7/2007 | Stokes | |
| 2007/0155911 A1 | 7/2007 | Stokes et al. | |
| 2009/0258803 A1 | 10/2009 | Harrison et al. | |
| 2009/0318624 A1 | 12/2009 | Storey et al. | |

FOREIGN PATENT DOCUMENTS

| | | |
|---|---|---|
| DE | 253827 | 2/1988 |
| DE | 262028 | 11/1988 |
| DE | 262233 | 11/1988 |
| DE | 266104 | 3/1989 |
| DE | 282697 | 9/1990 |
| DE | 296283 | 11/1991 |
| DE | 296284 | 11/1991 |
| DE | 296285 | 11/1991 |
| DE | 296286 | 11/1991 |
| EP | 206756 A2 | 12/1986 |
| EP | 255181 A1 | 2/1988 |
| EP | 342792 A1 | 11/1989 |
| EP | 397081 A2 | 5/1990 |
| EP | 400844 A1 | 5/1990 |
| EP | 341012 B1 | 12/1992 |
| EP | 959096 A1 | 11/1999 |
| EP | 1209170 A1 | 5/2002 |
| EP | 1489109 A2 | 12/2004 |
| GB | 1 159 368 | 4/1987 |
| GB | 2 184 738 A | 7/1987 |
| JP | 03287605 | 12/1991 |
| JP | 5-186513 | 7/1993 |
| JP | 2001172567 A | 6/2001 |
| WO | WO 90/05711 | 5/1990 |
| WO | WO 94/13706 | 6/1994 |
| WO | WO 97/19962 A1 | 6/1997 |
| WO | WO 99/09074 | 2/1999 |
| WO | WO 00/75202 A1 | 12/2000 |
| WO | WO 03/106390 A1 | 12/2003 |
| WO | WO 2004/048215 A2 | 6/2004 |
| WO | WO 2006/110647 A1 | 10/2006 |

OTHER PUBLICATIONS

Bauer et al., "Complexes of stannic chloride and alkyl phenols and the influence of these complexes and of free phenol on the cationic polymerization of isobutene", Can. J. Chem., 48, 1251, 1970.

Bauer et al., "Cationic polymerication of isobutene initiated by stannic chloride and phenols: polymer endgroup studies", J. Poly. Sci., A-1(9), 1451, 1971.

Bezumnova et al., "Reaction of 2-mercaptobenzothiazole with ethylenic hydrocarbons" (English abstract), Khim. Geterosikl. Soedin. 80, 194, 1971.

Boileau et al., "Reaction of functionalised thiols with oligoisobutenes via free-radical addition. Some new routes to thermoplastic crosslinkable polymers", European Polymer Journal, 39, 1395-1404, 2003.

Database WPI Section Ch. Week 197201 Derwent Publications Ltd. London, GB; AN 1972-00713T XP002316480—& SU 293 804 A (ND Zelinskii organic chem) Jan. 26, 1971 abstract.

De et al., "Carbocationic polymerization of isobutylene using methylaluminum bromide coinitiators: synthesis of bromoallyl functional polyisobutylene", Macromolecules, 39(22), 7527, 2006.

De et al., "Relative Reactivity of C4 olefins toward the polyisobutylene cation", Macromolecules, 39, 6861, 2006.

De et al., "Capping reactions in cationic polymerization: kinetic and synthetic utility", ACS Div. Polym. Chem., Polym. Preprs., 46, 847, 2005.

Diaz et al., "A Polymer Electrode with Variable Conductivity: polypyrrole", J. I. J. Chem. Soc., Chem. Comm, 397-398, 1980.

Diaz et al., "Electrochemical Polymerization of Pyrrole", J. Chem. Soc., Chem Comm., 635-636, 1979.

Faust et al., "Living Carbocationic Polymerization. XXI. Kinetic and mechanistic studies of isobutylene polymerization initiated by trimethylpentyl esters of different acids", J. Macromol. Sci.—Chem., A27(6), 649-667, 1990.

Gardini, "The Oxidation of Monocyclic Pyrroles", Adv. Heterocyl. Chem 15(67), 67-99, 1973.

Gonzales de la Campa, J., Pham, Q. Makromol. Chem., 182, 1415, 1981 (English Abstract).

Gorski et al., "Functionalized polyisobutenes by SH-en addition", Die Angewandte Makromolekulare Chemie, 253, 51-64, 1997.

Hadjikyriacou et al., "Cationic Macromolecular Design and Synthesis Using Furan Derivatives", Macromolecules, 32, 6394-6399, 1999.

Hadjikyriacou et al., "Living Coupling Reaction in living cationic polymerization. 3. Coupling reaction of living polyisobutylene using bis(furanyl) derivatives", Macromolecules, 33, 730-733, 2000.

Higashihara et al., "Synthesis of Poly(isobutylene-block-methyl methzcrylate) by a novel coupling approach", Macromolecules, 39(16), 5275, 2006.

Ipatieff et al., "Reaction of Aliphatic Olefins with Thiophenol", J. Am. Chem. Soc. 60, 2731, 1938.

Kaszas et al., "Living carbocationic polymerization. Isobutylene polymerization in the presence of pyridine and various other electron donors", Polymer Bulletin (Berlin), 20(5), 413-19, 1988.

Kennedy et al., "New Telechelic Polymers and Sequential Copolymers by Polyfunctional Initiator Transfer Agents (Inifers) V. Synthesis of a-tert-butyl-w-isopropenylopolyisobutylene and a, w-Di(isopropenyl)polyisobutylene", Polymer Bulletin, 1, 575-580, 1979.

Kennedy et al., "New Telechelic polymers and sequential Copolymers by Polyfunctional Initiator Transfer Agents (Inifers) 27 bisphenol and trisphenol polyisobutylenes", Poly. Bull., 8, 563-570, 1982.

Kennedy et al., Journal of Macromolecular Science, Chemistry, A28(2), 197-207, 1991.

Kim et al., "Synthesis and Characterization of Novel Silicon-Functional Polyisobutylenes and Their Applications: Polyisobutylene Brushes on Silicate Substrates via Living Cationic Polymerization", Journal of Macromlecular Science Part A—Pure and Applied Chemistry. A40(10), 991-1008, 2003.

Klemm et al., "Untersuchungen zur Thioladdition an Polybutadiene", Angew Makromol. Chem., 207, 187, 1993 (English Abstract).

Klemm et al., "Unusual addition by the thiol-ene photopolymerization", Polym. Bull. (Berlin) 28, 653, 1992.

Koroskenyl et al., "Initiation via haloboration in living cationic polymerization. 6. A novel Method for the synthesis of primary amine functional polyisobutylenes", Pure Appl. Chem., A36(12), 1879-1893, 1999.

Lenz, "Organic Chemistry of Synthetic High Polymers," Section 7.2 Poly(alkylene Sulfides), Interscience Publishers, New York, p. 196, 1967.

Li et al., "Polyisobutylene supports—a non-polar hydrocarbon analog of PEG supports", Tetrahedron, 61, 12081-12092, 2005.

Maenz et al., "Investigation of the structure of low molecular weight polybutadienes and epoxides made therefrom", Acta Polymerica, 47(5), 208-213, 1996.

Maenz et al., "Macromonomers based on low-molecular-weight polyisobutenes", Angewandte Makromolekulare Chemie, 242, 183-197, 1996.

Maenz et al., "Comb-like polymers from macromonomers based on low-molecular weight poly(isobutene)s", Angewandte Makromolekulare Chemie, 258, 69-73, 1998.

Martinez-Castro et al., "Polyisobutylene Stars and Polyisobutylene-block-poly(tert-butyl methacrylate) block copolymers by site transformation of thiophene end-capped polyisobutylene chain ends", Macromolecules, 36, 6985-6994, 2003.

Mishra et al., "New telechelic polymers and sequential copolymers by polyfunctional initiator transfer agents (inifers) LI. Synthesis and characterization of anisole terminated polyisobutylenes", Poly. Bull., 16, 47-53, 1982.

Morgan et al., "Thiol/Ene Photocurable Polymers", J. Polym. Sci. Polym. Chem. Ed., 15, 627, 1977.

Nielsen et al., "Synthesis of isobutenyl-telechelic polyisobutylene by functionalization with isobutenyltrimethylsilane", Polymer, 38(10), 2529-2534, 1997, Elsevier Science Ltd.

Nuyken et al., "Novel sulfur containing polymers", Makromol. Chem. Macromol. Symp, 26, 313, 1989.

Nuyken et al., "Telechelics via addition of dithiols onto alkadienes, 1 Radical mechanism", Makromol. Chem. Rapid Commun. 11, 365, 1990.

Nuyken et al., Polym. Bull. (Berlin), 4, 61-65, 1981.

Puskas et al., "The Nature of the Double Bond in Low Molecular Weight Polyisobutylenes and Polybutene Copolymers", J. Polymer Sci: Symposium No. 56, 191, 1976.

Rooney, "Synthesis of Phenol-Terminated Polyisobuylene: competitive chain transfer reactions", J. Appl. Poly. Sci. , 25, 1365-1372, 1980.

Roth et al., "A Novel Method of the Determination of Propagation Rate Constants: Carbocationic Oligomerization of Isobutylene", Macromolecules, J. American Chemical Society, vol. 29, No. 19, 6104-6109, 1996.

Schriescheim et al., "Industrial Friedel-Crafts chemistry: Past and future", Chemtech, 310, 1978.

Serniuk et al., "Study of the Reaction of Buna Rubbers of Aliphatic Mercaptans", J. Am. Chem. Soc. 70, 1804, 1948.

Si et al., "Living carbocationic polymerization. Narrow molecular weight distribution polyisobutylenes prepared by esters and ketones as electron donors", Polymer Bulletin (Berlin) 33(6), 651-6, 1994.

Simison et al., "End-Quenching of Quasiliving Carbocationic Isobutylene Polymerization with Hindered Bases: Quantitative Formation of exo-Olefin-Terminated Polyisobutylene", Macromolecules, 39, 2481-2487, 2006.

Stacey et al. Organic Reactions: vol. 13, pp. 150-208 and 233-333, 1963.

Storey et al., "N-methylpyrrole-terminated polyisobutylene through end-quenching of quasiliving carbocationic polymerization", Macromolecules, 38(11), 4618-4624, 2005.

The University of Southern Mississippi, "Synthesis and Characterization of Novel Polyisobutylene Based Materials: Gradient Block Copolymers, Exo-olefins via in situ Quenching, and Carboxylic Acid Functional Telechelics", Dec. 2007.

Zhang et al., "Synthesis of Polyisobutylene with arylamino terminal group by combination of cationic polymerization with alkylation", Poly. Sci. A. Poly. Chem, 46, 936-946, 2008.

Zinger et al., "Timed Release of Chemicals from Polypyrrole Films", J. Am. Chem. Soc. vol. 106, No. 22, 6861-6863, 1984.

Office Action mailed Jan. 2, 2008, U.S. Appl. No. 11/207,377.
Office Action mailed Mar. 23, 2007, U.S. Appl. No. 11/207,377.
Office Action mailed Dec. 5, 2008, U.S. Appl. No. 11/357,562.
Office Action mailed Nov. 12, 2008, U.S. Appl. No. 11/207,366.
Office Action mailed Nov. 12, 2008, U.S. Appl. No. 11/207,264.
Office Action mailed Jan. 8, 2009, U.S. Appl. No. 11/356,490.
Notice of Allowance mailed Dec. 3, 2008, U.S. Appl. No. 11/356,491.
Office Action mailed May 13, 2008, U.S. Appl. No. 11/356,491.
Office Action mailed Feb. 20, 2009, U.S. Appl. No. 11/186,157.
Office Action mailed Oct. 20, 2008, U.S. Appl. No. 11/186,157.
Office Action mailed Apr. 1, 2008, U.S. Appl. No. 11/186,157.
Notice of Allowance mailed Aug. 11, 2005, U.S. Appl. No. 10/600,898.

Evsyukov et al., "Chemical dehydrohalogenation of halogen-containing polymer", Russian Chemical Reviews, 60(4), 373-390, 1991.

Fodor et al., "Synthetic Applications of Non-Polymerizable Monomers in Living Carbocationic Polymerizations", ACS Div. Polym. Chem., Polym. Preprs., 35(2), 492-493, 1994.

Hadjikyriacou, et al., "Living Coupling Reaction in Living Cationic Polymerization. 4. Synthesis of Telechelic Polyisobutylenes Using Bis-Furanyl Derivatives as Coupling Agents", JMS PureApplChem, A37, 1333-52, 2000.

Hamley, "Block Copolymers", Encyclopedia of Polymer Science and Technology, 457-482, Mar. 2003.

Higashihara et al., "Synthesis of Poly(isobutylene-block-methyl methzerylate) by a novel coupling approach", Macromolecules, 39(16), 5275, 2006.

Ivan et al., "New telechelic polymers and sequential copolymers by polyfunctional initiator-transfer agents (inifers)", J. Poly. Chem. Ed., 18, 3177-3191, 1980.

Ivan et al., "Living carbocationic polymerization. XXX. One-pot synthesis of allyl-terminated linwar and tri-arm star polyisobutylenes, and epoxy-and hydroxy-telechelics therefrom", J. Polym. Sci.: Part A: Polym. Chem., 28, 89-104, 1990.

Keki et al., "Dimethyldioxirane as a New and Effective Oxidation Agent for the Epoxidation of a,w-Di(isobutenyl)polyisobutylene: A convenient Synthesis of a,w-Di(2-methyl-3-hydroxypropyl)-polyisobutylene", J. Poly. Sci. A Poly. Chem., 40, 3974-3986, 2002.

Kennedy et al., "New Telechelic Polymers and Sequential Copolymers by Polyfunctional Initiator-Transfer Agents (Inifers)", Polym. Bull., 9, 27-32, 1983.

Machl et al., "Novel Synthetic Routes to Aminofunctionalized Polyisobutylenes", ACS Div. Polym. Chem. Polym. Preprs., 44(2), 858-859, 2003.

Nemes et al., "Oxyethylation and Carbonation of Telechelic Polyisobutylene Anions", Poly. Bull. 24, 187-194, 1990.

Sawamoto et al., "End Functionalized Polymers by Living Cationic Polymerization", Macromolecules, 20(1), 1-6, 1987.

Ummadisetty et al., "Rapid Communication: Quantitative Syntheses of Novel Polyisobutylenes Fitted with Terminal Primary -Br, -Oh, -NH2, and Methacrylate Termini", J. Poly. Sci. A Poly. Chem., 46, 4236-4242, 2008.

Wallace et al., "Intelligent Polymer Systems", Encyclopedia of Polymer Science and Technology, 231-250, Jul. 2004.

Wollyung et al., "Intelligent Polymers Systems", J. Poly. Sci. A Poly. Chem., 43, 946-958, 2005.

Notice of Allowance mailed Aug. 6, 2009, U.S. Appl. No. 11/207,264.
Notice of Allowance mailed Aug. 7, 2009, U.S. Appl. No. 11/207,366.
Office Action mailed Aug. 31, 2009, U.S. Appl. No. 11/356,490.
Office Action mailed Aug. 7, 2009, U.S. Appl. No. 11/357,562.

Cheng et al., "Study of the interactions of organic sulfides with active species in the cationic polymerization of 1,3-pentadiene", Polymer Bulletin 51(5-6), 343-349, Apr. 2004.

Faust et al., "Living Carbocationic Polymerization. IV. Living Polymerization of Isobutylene", J. Polym. Sci. A Polym. Chem. 25, 1847-1864, 1986.

Kaszas et al., "Electron Pair Donors in Carbocationic Polymerization. 2. Mechanism of Living Carbocationic Polymerizations and the Role of in Situ and External Electron Pair Donors", Macromolecules 23, 3909-3915, 1990.

Kennedy et al., "New Telechelic Polymers and Sequential Copolymers by Polyfunctional Initiator-Transfer Agents, (Inifers) 10. Three-Arm Star Telechelic Polyisobutylenes Carrying Chlorine, Olefin or Primary Alcohol Endgroups", Polym. Bull. 4, 67-74, 1981.

Kennedy et al., "New Telechelic Polymers and Sequential Copolymers by Polyfunctional Initiator-Transfer Agents, I.", Polym. Prepr. (Am. Chem. Soc., Div. Polym. Chem.) 20(2), 316, 1979.

Kennedy et al., "New Telechelic Polymers and Sequential Copolymers by Polyfunctional Initiator-Transfer Agents, II.", J. Polym. Sci., Polym. Chem. Ed., 18, 1523, 1980.

Mishra et al., "Living Carbocationic Polymerization, VIII.", J. P. Polym. Bull. 17, 7-13, 1987.

Odian, Principles of Polymerization, 4th ed., Wiley, Chapter 8 (2004).

Pernecker et al., "Living Carbocationic Polymerization, XLVI. Living isobutylene polymerization induced by the common ion effect", Polym. Bull. 26, 305-312, 1991.

Puskas et al., "Investigation of the Effect of Epoxide Structure on the Initiation Efficiency in Isobutylene Polymerizations Initiated by Epoxide/$TiCl_4$ Systems", Euro. Polymer Journal 39: 2147-2153, 2003.

Sita et al., "Amidinate-based catalysts for stereoselective living ziegler-natta polymerizations", Abstracts of Papers of the American Chemical Society, vol. 224, Part 2, pp. U502-U502, 2002.

Notice of Allowance mailed Dec. 10, 2009, U.S. Appl. No. 11/207,264.

Notice of Allowance mailed Dec. 15, 2009, U.S. Appl. No. 11/207,366.

Supplemental Notice of Allowance mailed Apr. 2, 2010, U.S. Appl. No. 11/207,366.

Notice of Allowance mailed Apr. 28, 2010, U.S. Appl. No. 11/356,490.

Final Office Action mailed Apr. 2, 2010, U.S. Appl. No. 11/357,562.

* cited by examiner

PRODUCTION OF VINYLIDENE-TERMINATED POLYOLEFINS VIA QUENCHING WITH MONOSULFIDES

1. FIELD

Provided herein are methods for preparing vinylidene-terminated polyolefins.

2. BACKGROUND

Vinylidene terminated polyolefins, such as polyisobutylene (PIB), are useful precursors for the preparation of polymers containing functional end groups. Vinylidene end groups may be transformed into other specific functional end groups. Polymers containing specific end groups have several useful purposes. For example, PIB-based succinimide dispersants are useful additives for engine lubricants, and polyisobutylene amines are useful as fuel additives. The vinylidene isomer is the most reactive isomer towards many reactions selected to transform the polyolefin chain end. Thus, there is a need for methods of selectively or exclusively producing vinylidene terminated polyolefins.

In recent years, considerable research has been conducted in the field of quasiliving cationic polymerization (QLCP) of olefins. Quasiliving polymerizations proceed with minimal chain transfer while irreversible termination is practically absent. Therefore, QLCP yields polymers with well defined architectures and narrow molecular weight distributions. Another advantage of QLCP is that it offers the potential for in situ functionalization of the polymer chain ends and block copolymer synthesis. In situ functionalization provides materials which are amenable towards further post-polymerization reactions.

Research involving in situ functionalization of QLCP has yielded a variety of end groups. However, successful production of the vinylidene terminus has been achieved in a limited number of cases. Kennedy et al. disclosed the use of allyltrimethylsilane as a quenching agent to cap PIB with an allyl group (J. Poly. Sci. A: Poly. Chem., 25, 3255, 1987). Mayer et al. illustrated a similar reaction through the use of 2-methallyltrimethylsilane to yield the exo olefin product (Macromolecules, 29, 6104, 1996). However, both of these synthetic routes utilize rather expensive reagents which are consumed in the reaction with PIB during the quenching step.

Recent work by Stokes et al., in US Patent Publication Nos. 2006/0041083 and 2006/0041084, describes the in situ conversion of quasiliving, tertiary chloride PIB chain ends to vinylidene via the use of certain nitrogen-containing quenching agents.

A need exists in the art to develop new in situ processes for producing vinylidene terminated polyolefins which offer the potential recovery of key reagents in the quenching process. Recycling of quenching agents could lead to reduced cost.

3. SUMMARY

In one embodiment, provided herein are methods for preparing a vinylidene terminated polyolefin comprising:
a. ionizing a polyolefin in the presence of a Lewis acid to form an ionized polyolefin;
b. reacting the ionized polyolefin from step (a) with one or more dihydrocarbylmonosulfides; and
c. reacting the product of step (b) with one or more proton acceptor compounds.

In some embodiments, the dihydrocarbylmonosulfide has the formula:

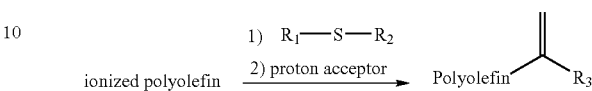

wherein $R_1$ and $R_2$ are each, independently, hydrocarbyl.

In some embodiments, the method is represented by the following scheme:

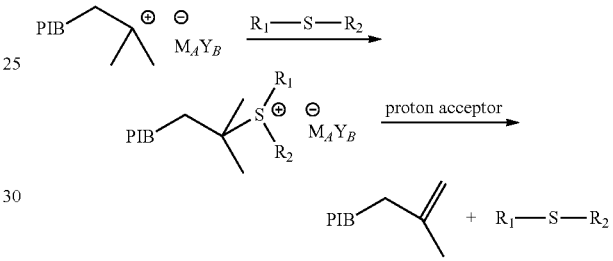

wherein $R_1$ and $R_2$ are each, independently, hydrocarbyl; and $R_3$ is hydrogen or hydrocarbyl, such as methyl.

In some embodiments, the vinylidene terminated polyolefin formed is at least 94 percent by mole of all products.

Without being limited to any theory, in some embodiments, the methods described herein appear to proceed by the pathway shown in the following scheme:

wherein $R_1$ and $R_2$ are each, independently, hydrocarbyl; M is a metal, transition metal, or metalloid; Y is a halide; and A and B are each, independently, an integer from 1 to 20.

4. DETAILED DESCRIPTION

4.1 Definitions

Unless defined otherwise, all technical and scientific terms used herein have the same meaning as is commonly understood by one of ordinary skill in the art. In the event that there are a plurality of definitions for a term used herein, the definitions provided in this section prevail unless stated otherwise.

As used herein, "alcohol" refers to a compound of formula:

R—OH wherein R is aliphatic hydrocarbyl, such as alkyl, which may be substituted, for example, with an aromatic moiety, such as aralkyl.

As used herein, "alkyl" refers to a carbon chain or group containing from 1 to 20 carbons, or 1 to 16 carbons. Such chains or groups may be straight or branched. Exemplary alkyl groups herein include, but are not limited to, methyl, ethyl, propyl, isopropyl, isobutyl, n-butyl, sec-butyl, tert-butyl, iospentyl, neopentyl, tert-pentyl, or isohexyl. As used herein, "lower alkyl" refers to carbon chains or groups having from 1 carbon atom to about 6 carbon atoms.

As used herein, "alkenyl" refers to a carbon chain or group containing from 2 to 20 carbons, or 2 to 16 carbons, wherein the chain contains one or more double bonds. An example includes, but is not limited to, an allyl group. The double bond of an alkenyl carbon chain or group may be conjugated to another unsaturated group.

As used herein, "alkynyl" refers to a carbon chain or group containing from 2 to 20 carbons, or 2 to 16 carbons, wherein the chain contains one or more triple bonds. An example includes, but is not limited to, a propargyl group. The triple bond of an alkynyl carbon chain or group may be conjugated to another unsaturated group.

As used herein, "aryl" refers to a monocyclic or multicyclic aromatic group containing from 6 to about 30 carbon atoms. Aryl groups include, but are not limited to, fluorenyl, phenyl, or naphthyl.

As used herein, "alkaryl" refers to an aryl group substituted with at least one alkyl, alkenyl, or alkynyl group.

As used herein, "aralkyl" refers to an alkyl, alkenyl, or alkynyl group substituted with at least one aryl group.

As used herein, "amide" refers to a compound of formula:

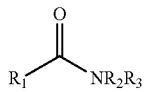

wherein $R_1$-$R_3$ are each, independently, hydrogen or hydrocarbyl.

As used herein, "amine" refers to a compound of formula:

wherein $R_1$-$R_3$ are each independently, hydrogen or hydrocarbyl.

As used herein, "carbocation" and "carbenium ion" refer to a positively charged carbon atom.

As used herein, "carbocation terminated polyolefin" refers to a polyolefin containing at least one carbocation end group. Examples include, but are not limited to, compounds of the formula:

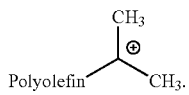

As used herein, "chain end concentration" refers to the sum of the concentrations of olefin end groups, tert-halide end groups, and carbenium ions. When a mono-functional initiator is used, the chain end concentration is approximately equal to the initiator concentration. For a multi-functional initiator, when the functionality of the initiator equals x, then the chain end concentration is approximately equal to x times the initiator concentration.

As used herein, "chain transfer agent" refers to a compound which interchanges its halide ion with a carbenium ion to form a new carbenium ion.

As used herein, "common ion salt" refers to an ionic salt that is optionally added to a reaction performed under quasiliving carbocationic polymerization conditions to prevent dissociation of the propagating carbenium ion and counter-ion pairs.

As used herein, "common ion salt precursor" refers to an ionic salt that is optionally added to a reaction performed under quasiliving carbocationic polymerization conditions, which generates counter-anions that are identical to those of the propagating chain ends, via in situ reaction with a Lewis acid.

As used herein, "coupled polyolefin" refers to the product of the addition of a carbocation terminated polyolefin to another polyolefin.

As used herein, "diluent" refers to a liquid diluting agent or compound. Diluents may be a single or a mixture of two or more compounds. Diluents may completely dissolve or partially dissolve the reaction components. Examples include, but are not limited to, hexane or methyl chloride, or mixtures thereof.

As used herein, "dihydrocarbylmonosulfide" refers to a compound of formula:

wherein $R_1$ and $R_2$ are each, independently, hydrocarbyl.

As used herein, "electron donor" refers to a molecule that is capable of donating a pair of electrons to another molecule. Examples include, but are not limited to, molecules capable of complexing with Lewis acids. Further examples include, but are not limited to, bases and/or nucleophiles. Further examples include, but are not limited to, molecules capable of abstracting or removing a proton.

As used herein, "exo-olefin" refers to a compound of the formula

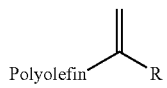

wherein R is hydrocarbyl. In one embodiment, R is methyl.

As used herein, "halide, "halo," or "halogen" refer to F, Cl, Br, or I.

As used herein "hydrocarbyl" refers to a monovalent, linear, branched or cyclic group which contains only carbon and hydrogen atoms.

As used herein, "inifer" refers to a compound that acts as both an initiator and a chain transfer agent.

As used herein, "initiator" refers to a compound that provides a carbocation. Examples include, but are not limited to, compounds or polyolefins with one or more tertiary end groups. An initiator may be mono-functional or multi-functional. As used herein, "mono-functional initiator" refers to an initiator that provides approximately one stoichiometric equivalent of carbocation relative to initiator. As used herein, "multi-functional initiator" refers to an initiator that provides approximately x stoichiometric equivalents of carbocation relative to initiator, wherein x represents the functionality of the initiator. When a mono-functional initiator is used, the chain end concentration is approximately equal to the initiator concentration. For a multi-functional initiator, when the functionality of the initiator equals x, then the chain end concentration equals x times the initiator concentration.

As used herein, "ionized polyolefin" refers to a polyolefin containing at least one carbenium ion. An example includes, but is not limited to, a tert-halide terminated polyolefin that has been ionized into a cationic polyolefin. A further example includes, but is not limited to, a quasiliving carbocationic polyolefin. A further example includes, but is not limited to, vinylidene terminated polyolefin that has been ionized into an ionized polyolefin or quasiliving carbocationic polyolefin. A further example includes, but is not limited to, a polyolefin containing an olefin that has been ionized into a quasiliving carbocationic polyolefin or a cationic polyolefin. A further example includes, but is not limited to, an ionized polyolefin derived from an inifer.

As used herein, "Lewis acid" refers to a chemical entity that is capable of accepting a pair of electrons.

As used herein, "monomer" refers to an olefin that is capable of combining with a carbocation to form another carbocation.

As used herein, "nitroalkane" refers to $RNO_2$, wherein R is alkyl, alkenyl, alkynyl, aryl, alkaryl, or aralkyl.

As used herein, "percent by mole of all products" refers to the proportion of the number of moles of a particular product of a reaction to the number of moles of all products of the reaction multiplied by one hundred.

As used herein, "proton acceptor" refers to a compound capable of abstracting a proton.

As used herein, "pyridine derivative" refers to a compound of the formula:

[Structure: pyridine ring with $R_1$, $R_2$, $R_3$, $R_4$, $R_5$ substituents]

wherein $R_1$, $R_2$, $R_3$, $R_4$, and $R_5$ are each, independently, hydrogen or hydrocarbyl; or $R_1$ and $R_2$, or $R_2$ and $R_3$, or $R_3$ and $R_4$, or $R_4$ and $R_5$ independently form a fused aliphatic ring of about 4 to about 7 carbon atoms or a fused aromatic ring of about 5 to about 7 carbon atoms. When $R_1$, $R_2$, $R_3$, $R_4$, and $R_5$ are each hydrogen, the compound is pyridine.

As used herein, "quasiliving carbocationic polymerization conditions" refers to quasiliving polymerization conditions that allow for the formation of quasiliving carbocationic polyolefins.

As used herein, "quasiliving carbocationic polyolefin" refers to a carbocationic polyolefin that has been formed under quasiliving polymerization conditions.

As used herein, "quasiliving polymerization" refers to polymerizations that proceed in the absence of irreversible chain-breaking events. Quasiliving polymerizations proceed by initiation and is followed by propagation, wherein propagating (living) species are in equilibrium with non-propagating (non-living) polymer chains.

As used herein, "quasiliving polymerization conditions" refers to reaction conditions that allow quasiliving polymerization to occur.

As used herein, "quenching" refers to reacting a carbenium ion with a quenching agent.

As used herein, "quenching agent" refers to a compound that can, either alone or in combination with another compound, react with a carbenium ion.

As used herein, "substituted benzene" refers to a compound of the formula:

[Structure: benzene ring with $(R)_n$ substituent]

wherein R is alkyl, alkenyl, alkynyl, aryl, alkaryl, or aralkyl; and n is 1-6. In some embodiments, R is lower alkyl. In some embodiments, R is methyl. In some embodiments, n is 1-4. In some embodiments, n is 1-3.

As used herein "vinylidene end group" refers to a terminal olefin moiety which has an exo-olefin configuration.

As used herein, "vinylidene terminated polyolefin" refers to a polyolefin that contains at least one vinylidene end group. Examples include, but are not limited to, compounds of the following formula:

[Structure: Polyolefin-C(=CH$_2$)-R]

wherein R is hydrogen or hydrocarbyl.

As used herein, "tert-halide terminated polyolefin" refers to a polyolefin that contains at least one tertiary halide end group. An example includes, but is not limited to, a compound of formula:

[Structure: Polyolefin-C(CH$_3$)$_2$-X]

wherein X is a halogen.

4.2 Methods

Provided herein are methods for preparing a vinylidene terminated polyolefin comprising:
   a. ionizing a polyolefin in the presence of a Lewis acid to form an ionized polyolefin;
   b. reacting the ionized polyolefin from step (a) with one or more dihydrocarbylmonosulfides; and
   c. reacting the product of step (b) with one or more proton acceptor compounds.

In some embodiments, the method is represented by the following scheme:

ionized polyolefin $\xrightarrow{\text{1) } R_1-S-R_2 \text{ 2) proton acceptor}}$ Polyolefin-C(=CH$_2$)-$R_3$ wherein $R_1$ and $R_2$ are each, independently, hydrocarbyl; and $R_3$ is hydrogen or hydrocarbyl.

In some embodiments, the polyolefin prepared by the methods provided herein contains one vinylidene end group on the polyolefin chain. In some embodiments, the polyolefin prepared by the methods provided herein contains more than one vinylidene end group on the polyolefin chain.

Without being limited to any theory, in some embodiments, the methods described herein appear to proceed by the pathway shown in the following scheme:

[Scheme: PIB-C$^+$ $M_AY_B^-$ $\xrightarrow{R_1-S-R_2}$ PIB-C-S$^+$($R_1$)($R_2$) $M_AY_B^-$ $\xrightarrow{\text{proton acceptor}}$ PIB-C(=CH$_2$) + $R_1-S-R_2$]

wherein $R_1$ and $R_2$ are each, independently, hydrocarbyl; M is a metal, transition metal, or metalloid; Y is a halide; and A and B are each, independently, an integer from 1 to 20. In some embodiments, $M_A Y_B$ is derived from a Lewis acid described herein.

4.2.1 Ionized Polyolefins

Ionized polyolefins may be made by any method known to those of skill in the art. Examples include, but are not limited to, ionizing a tert-halide with a Lewis acid; ionizing a preformed polyolefin with a Lewis acid; polymerizing an olefin monomer under quasiliving carbocationic polymerization conditions; or performing the "inifer" method.

In some embodiments, the ionized polyolefin is a carbocation terminated polyolefin. In some embodiments, the ionized polyolefin contains one or more carbocation end groups. In some embodiments, the ionized polyolefin contains one carbocation end group. In some embodiments, the ionized polyolefin contains two carbocation end groups. In some embodiments, the ionized polyolefin contains three carbocation end groups. In some embodiments, the ionized polyolefin is a polyisobutylene with a cationic end group. In some embodiments, the ionized polyolefin is a compound of the following formula:

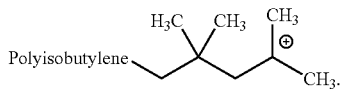

(a) Ionized Polyolefins from Tert-halides

In some embodiments, the ionized polyolefin is derived from a tert-halide terminated polyolefin. In some embodiments, the ionized polyolefin is derived form a tert-chloride terminated polyolefin, tert-bromide terminated polyolefin, or tert-iodide terminated polyolefin. In some embodiments, the ionized polyolefin is derived from a tert-chloride terminated polyolefin or tert-bromide terminated polyolefin. In some embodiments, the ionized polyolefin is derived from a tert-chloride polyolefin.

Tert-halide terminated polyolefins may be made by any method known to those of skill in the art.

In some embodiments, the ionized polyolefin is generated by contacting a tert-halide terminated polyolefin with a Lewis acid. In some embodiments, the ionized polyolefin is generated by contacting a tert-chloride terminated polyolefin, tert-bromide terminated polyolefin, or tert-iodide terminated polyolefin with a Lewis acid. In some embodiments, the ionized polyolefin is generated by contacting a tert-chloride terminated polyolefin with a Lewis acid.

In some embodiments, the tert-halide is derived from an inifer.

(b) Ionized Polyolefins from Preformed Polyolefins

In some embodiments, the ionized polyolefin is derived from a preformed polyolefin. In some embodiments, such preformed polyolefin contains one or more double bonds. In some embodiments, such preformed polyolefin contains one double bond. In some embodiments, such preformed polyolefin is a polyisobutylene derivative. In some embodiments, such preformed polyolefin contains one or more endo olefins.

In some embodiments, the ionized polyolefin is generated by contacting a Lewis acid with a preformed polyolefin. In some embodiments, the ionized polyolefin is generated by contacting a preformed polyolefin containing one or more double bonds with a Lewis acid. In some embodiments, the ionized polyolefin is generated by contacting a preformed polyolefin containing one double bond with a Lewis acid. In some embodiments, the ionized polyolefin is generated by contacting a polyisobutylene derivative with a Lewis acid. In some embodiments, the ionized polyolefin is generated by contacting a preformed polyolefin containing one or more endo olefins with a Lewis acid.

(c) Ionized Polyolefins from the Inifer Method

In some embodiments, the ionized polyolefin is derived from an inifer using methods known to those of skill in the art. Non-limiting examples of such methods are described in U.S. Pat. Nos. 4,276,394 and 4,568,732, each of which is incorporated by reference herein. In some embodiments, a monomer is reacted with an inifer carrying at least two tertiary halogens under cationic polymerization conditions. In some embodiments, the inifer is a binifer or a trinifer. In some embodiments, the inifer is tricumyl chloride, paradicumyl chloride, or tricumyl bromide.

(d) Ionized Polyolefins from Olefinic Monomers Under Quasiliving Carbocationic Polymerization Conditions In some embodiments, the ionized polyolefin is derived from olefinic monomers under quasiliving carbocationic conditions. Under such conditions, a quasiliving carbocationic polyolefin is generated. Such conditions may be achieved by any method known to those of skill in the art. Non-limiting examples of such methods are described in EP 206756 B1 and WO 2006/110647 A1, both of which are incorporated by reference herein.

In some embodiments, a monomer, an initiator, and a Lewis acid are used. In some embodiments, the ionized polyolefin is a quasiliving carbocationic polyisobutylene. In some embodiments, such quasiliving carbocationic polyolefin is a compound of the following formula:

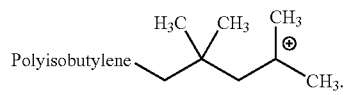

(i) Initiators

In some embodiments, the initiator is a compound or polyolefin with one or more tertiary end groups. In some embodiments, the initiator has one tertiary end group. In some embodiments, the initiator has more than one tertiary end group.

In some embodiments, the initiator is a compound of formula $(X'—CR_a R_b)_n R_c$ wherein $R_a$, $R_b$ and $R_c$ independently comprise at least one of alkyl, aromatic, alkyl aromatic groups, and can be the same or different, and X' is an acetate, etherate, hydroxyl group, or a halogen. In some embodiments, $R_b$ has a valence of n, and n is an integer of one to 4. In some embodiments, $R_a$, $R_b$ and $R_c$ are hydrocarbon groups containing one carbon atom to about 20 carbon atoms. In some embodiments, $R_a$, $R_b$ and $R_c$ are hydrocarbon groups containing one carbon atom to about 8 carbon atoms. In some embodiments, X' is a halogen. In some embodiments, X' is chloride. In some embodiments, the structure of $R_a$, $R_b$ and $R_c$ mimics the growing species or monomer. In some embodiments, such structure is a 1-phenylethyl derivative for polystyrene or a 2,4,4-trimethyl pentyl derivative for polyisobutylene. In some embodiments, the initiator is a cumyl, dicumyl or tricumyl halide. In some embodiments, chlorides are used. In some embodiments, the initiator is 2-chloro-2-phenylpropane, i.e., cumyl chloride; 1,4-di(2-chloro-2-propyl)benzene, i.e., di(cumylchloride); 1,3,5-tri(2-chloro-2-propyl)benzene, i.e., tri(cumylchloride); 2,4,4-trimethyl-2-chloropentane; 2-acetyl-2-phenylpropane, i.e., cumyl acetate; 2-propionyl-2-phenyl propane, i.e., cumyl propionate; 2-methoxy-2-phenylpropane, i.e., cumylmethyl ether; 1,4-di(2-methoxy-2-propyl)benzene, i.e., di(cumylmethyl ether); or 1,3,5-tri(2-methoxy-2-propyl)benzene, i.e., tri(cumylmethyl ether). In some embodiments, the initiator is 2-chloro-2,4,4-trimethyl pentane (TMPCl), 1,3-di(2-chloro-2-propyl)benzene, 1,3,5 tri(2-chloro-2-propyl)benzene, or 1,3,-di(2-chloro-2-propyl)-5-tert-butylbenzene (bDCC).

In some embodiments, the initiator is mono-functional, bi-functional, or multi-functional. In some embodiments, the initiator is mono-functional. In some embodiments, the initiator is 2-chloro-2-phenylpropane, 2-acetyl-2-phenylpropane, 2-propionyl-2-phenylpropane, 2-methoxy-2-phenylpropane, 2-ethoxy-2-phenylpropane, 2-chloro-2,4,4-trimethylpentane, 2-acetyl-2,4,4,-trimethylpentane, 2-propionyl-2,4,4-trimethylpentane, 2-methoxy-2,4,4-trimethylpentane, or 2-ethoxy-2,4,4-trimethylpentane. In some embodiments, the initiator is 2-chloro-2,4,4-trimethylpentane.

In some embodiments, the initiator is bi-functional. In some embodiments, the initiator is 1,3-di(2-chloro-2-propyl)benzene, 1,3-di(2-methoxy-2-propyl)benzene, 1,4-di(2-chloro-2-propyl)benzene, 1,4-di(2-methoxy-2-propyl)benzene, or 5-tert-butyl-1,3,-di(2-chloro-2-propyl)benzene. In some embodiments, the initiator is 5-tert-butyl-1,3,-di(2-chloro-2-propyl)benzene.

In some embodiments, the initiator is multi-functional. In some embodiments, the initiator is 1,3,5-tri(2-chloro-2-propyl)benzene or 1,3,5-tri(2-methoxy-2-propyl)benzene.

(ii) Monomers

In some embodiments, the monomer is a hydrocarbon monomer, i.e., a compound containing only hydrogen and carbon atoms, including but not limited to, olefins and diolefins, and those having from about 2 to about 20 carbon atoms. In some embodiments, such compounds have from about 4 to about 8 carbon atoms.

In some embodiments, the methods described herein can be employed for the polymerization of such monomers to produce polymers of different, but uniform molecular weights. In some embodiments, such molecular weight is from about 300 to in excess of a million g/mol. In some embodiments, such polymers are low molecular weight liquid or viscous polymers having a molecular weight of from about 200 to 10,000 g/mol, or solid waxy to plastic, or elastomeric materials having molecular weights of from about 100,000 to 1,000,000 g/mol, or more.

In some embodiments, the monomer is isobutylene, styrene, beta pinene, isoprene, butadiene, or substituted compounds of the preceding types. In some embodiments, the monomer is isobutylene, 2-methyl-1-butene, 3-methyl-1-butene, 4-methyl-1-pentene, or beta-pinene. In some embodiments, the monomer is isobutylene.

In some embodiments, mixtures of monomers may be used.

(iii) Lewis Acids

In some embodiments, the Lewis acid is a non-protic acid. In some embodiments, the Lewis acid is a metal halide or non-metal halide. In some embodiments, Lewis acid is a metal halide. In some embodiments, the Lewis acid is a titanium (IV) halide, a zinc (II) halide, a tin (IV) halide, or an aluminum (III) halide. In some embodiments, the Lewis acid is a titanium(IV) halide. In some embodiments, the Lewis acid is a tin (IV) halide. In some embodiments, the Lewis acid an aluminum (III) halide. In some embodiments, the Lewis acid is titanium tetrabromide or titanium tetrachloride. In some embodiments, the Lewis acid is titanium tetrachloride. In some embodiments, the Lewis acid is zinc chloride. In some embodiments, the Lewis acid is $AlBr_3$. In some embodiments, the Lewis acid is ethyl aluminum dichloride. In some embodiments the Lewis acid is a non-metal halide. In some embodiments, the Lewis acid is an antimony (VI) halide, a gallium (III) halide, or a boron (III) halide. In some embodiments, the Lewis acid is boron trichloride. In some embodiments, the Lewis acid is a trialkyl aluminum compound. In some embodiments, the Lewis acid is trimethyl aluminum.

In some embodiments, a mixture of two or more Lewis acids is used. In some embodiments, a mixture of two Lewis acids is used. In some embodiments, a mixture of a aluminum (III) halide and trialkyl aluminum compound is used. In some embodiments, a stoichiometric ratio of about 1:1 aluminum (III) halide to trialkyl aluminum compound is used. In some embodiments, a stoichiometric ratio of 2:1 aluminum (III) halide to trialkyl aluminum compound is used. In some embodiments, a stoichiometric ratio of 1:2 aluminum (III) halide to trialkyl aluminum is used. In some embodiments, the stoichiometric ratio of aluminum (III) halide to trialkyl aluminum is greater than 1. In some embodiments, the stoichiometric ratio of aluminum (III) halide to trialkyl aluminum is less than 1. In some embodiments, a mixture of aluminum tribromide and trimethyl aluminum is used.

In some embodiments, the Lewis acid is an alkyl aluminum halide. In some embodiments, the Lewis acid is a methyl aluminum bromide.

In some embodiments, the Lewis acid is added in one aliquot. In some embodiments, the Lewis acid is added in more than one aliquot. In some embodiments, the Lewis acid is added in two aliquots.

(iv) Electron Donors

As is understood to one of ordinary skill in the art, some electron donors are capable of converting traditional polymerization systems into quasiliving polymerization systems. In some embodiments, the methods described herein are performed in the presence of an electron donor. In some embodiments, such electron donor has a different formula than the one or more proton acceptors used to react with the sulfonium ion terminated polyolefin (described infra). In some embodiments, such electron donor has the same formula as the one or more proton acceptors used to react with the sulfonium ion terminated polyolefin (described infra). In some embodiments, the electron donor reacts with the sulfonium ion terminated polyolefin to form a vinylidene terminated polyolefin.

In some embodiments, the electron donor is capable of complexing with Lewis acids. In some embodiments, the electron donor is a base and/or nucleophile. In some embodiments, the electron donor is capable of abstracting or removing a proton. In some embodiments, the electron donor is an organic base. In some embodiments, the electron donor is an amide. In some embodiments, the electron donor is N,N-dimethylformamide, N,N-dimethylacetamide, or N,N-diethylacetamide. In some embodiments, the electron donor is a sulfoxide. In some embodiments, the electron donor is dimethyl sulfoxide. In some embodiments, the electron donor is an ester. In some embodiments, the electron donor is methyl acetate or ethyl acetate. In some embodiments, the electron donor is a phosphate compound. In some embodiments, the electron donor is trimethyl phosphate, tributyl phosphate, or triamide hexamethylphosphate. In some embodiments, the electron donor is an oxygen-containing metal compound. In some embodiments, the electron donor is tetraisopropyl titanate.

In some embodiments, the electron donor is pyridine or a pyridine derivative. In some embodiments, the electron donor is a compound of formula:

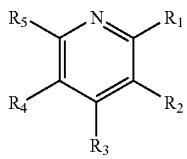

wherein $R_1$, $R_2$, $R_3$, $R_4$, and $R_5$ are each, independently, hydrogen or hydrocarbyl; or $R_1$ and $R_2$, or $R_2$ and $R_3$, or $R_3$ and $R_4$, or $R_4$ and $R_5$ independently form a fused aliphatic ring of about 3 to about 7 carbon atoms or a fused aromatic ring of about 5 to about 7 carbon atoms. In some embodiments, $R_1$ and $R_5$ are each, independently, hydrocarbyl, and $R_2$-$R_4$ are hydrogen.

In some embodiments, the electron donor is 2,6-di-tert-butylpyridine, 2,6-lutidine, 2,4-dimethylpryidine, 2,4,6-trimethylpyridine, 2-methylpyridine, or pyridine. In some embodiments, the electron donor is N,N-dimethylaniline or N,N-dimethyltoluidine. In some embodiments, the electron donor is 2,6-lutidine.

(v) Common Ion Salts and Ion Salt Precursors

In some embodiments, common ion salts or salt precursors may be optionally added to the reaction mixture in addition to or in replacement of the electron donor. In some embodiments, such salts may be used to increase the ionic strength, suppress free ions, and interact with ligand exchange. In some embodiments, the common ion salt precursor is tetra-n-butylammonium chloride. In some embodiments, the common ion salt precursor is tetra-n-butylammonium iodide In some embodiments, the concentration of the common ion salts or salt precursors in the total reaction mixture may be in the range from about 0.0005 moles per liter to about 0.05 moles per liter. In some embodiments, the concentration of the common ion salts or salt precursors is in the range from about 0.0005 moles per liter to about 0.025 moles per liter. In some embodiments, the concentration of the common ion salt or salt precursors is in the range from about 0.001 moles per liter to about 0.007 moles per liter.

4.2.2 Reaction with Dihydrocarbylmonosulfide (a) Dihydrocarbylmonosulfides

In some embodiments, the dihydrocarbylmonosulfide has the formula:

wherein $R_1$ and $R_2$ are each, independently, hydrocarbyl.

In some embodiments, $R_1$ and $R_2$ are each, independently, alkyl, alkenyl, alkynyl, aryl, alkaryl, aralkyl, or cycloalkyl. In some embodiments, $R_1$ and $R_2$ are each, independently, alkyl, alkenyl, alkynyl, aralkyl, or cycloalkyl. In some embodiments, $R_1$ and $R_2$ are each, independently, alkyl. In some embodiments, $R_1$ and $R_2$ independently contain from 1 to 20 carbon atoms.

In some embodiments, the dihydrocarbylmonosulfide is diethylsulfide, dipropylsulfide, diisopropylsulfide, diallylsulfide, diisoamylsulfide, di-sec-butyl sulfide, diisopentyl sulfide, dimethallylsulfide, methyl tert-octyl sulfide, dinonyl sulfide, dioctadecyl sulfide, dipentyl sulfide, or di-tert-dodecyl sulfide. In some embodiments, the dihydrocarbylmonosulfide is diethylsulfide, dipropylsulfide, diisopropylsulfide, diallylsulfide, or diisoamylsulfide. In some embodiments, the dihydrocarbylmonosulfide is diisopropylsulfide.

(b) Formation of Sulfonium Ion Terminated Polyolefin

Without being limited to any theory, in some embodiments, the dihydrocarbylmonosulfide acts as a quenching agent. Without being limited to any theory, in some embodiments, the dihydrocarbylmonosulfide reacts with the ionized polyolefin to form a sulfonium ion terminated polyolefin. Without being limited to any theory, in some embodiments, such sulfonium ion terminated polyolefin is stable. In some embodiments, such sulfonium ion terminated polyolefin is observable by spectroscopy. Without being limited to any theory, in some embodiments, the sulfonium ion terminated polyolefin is ion-paired with a Lewis acid derived counterion. Without being limited to any theory, in some embodiments, such counterion is a titanium halide. Without being limited to any theory, in some embodiments, such counterion is $^-Ti_2Cl_9$. Without being limited to any theory, in some embodiments, the dihydrocarbylmonosulfide is regenerated. Without being limited to any theory, in some embodiments, the reaction between the dihydrocarbylmonosulfide and ionized polyolefin proceeds by the reaction pathway described in the following scheme:

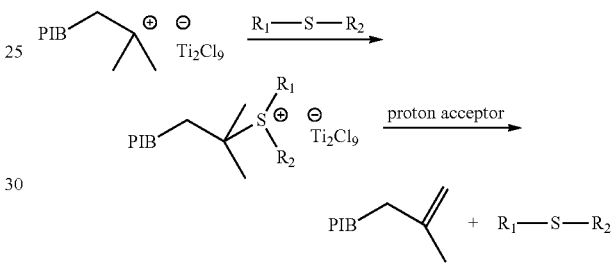

wherein $R_1$ and $R_2$ are each, independently, hydrocarbyl.

4.3 Reaction with Proton Acceptor

Without being limited to any theory, in some embodiments, a proton acceptor reacts with the sulfonium ion terminated polyolefin. Without being limited to any theory, a proton acceptor reacts with the sulfonium ion terminated polyolefin to form a vinylidene terminated polyolefin. Without being limited to any theory, in some embodiments, a proton acceptor abstracts a proton from the sulfonium ion terminated polyolefin. Without being limited to any theory, in some embodiments, the vinylidene-terminated polyolefin is the major product. Without being limited to any theory, the vinylidene terminated polyolefin is the major product, and polyolefins containing endo-olefins, tert-halide polyolefins, and coupled polyolefins are the minor products. Without being limited to any theory, in some embodiments, more than one proton acceptor reacts with the sulfonium ion terminated polyolefin. Without being limited to any theory, in some embodiments, more than one proton acceptor reacts with the sulfonium ion terminated polyolefin to form a vinylidene terminated polyolefin.

In some embodiments, the proton acceptor has a different formula than the electron donor described, supra. In some embodiments, the proton acceptor has the same formula as the electron donor described, supra.

In some embodiments, the proton acceptor is an organic base. In some embodiments, the proton acceptor is an amine. In some embodiments, the proton acceptor is a compound of formula:

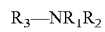

wherein $R_1$, $R_2$, and $R_3$ are each, independently, hydrogen or hydrocarbyl. In some embodiments, $R_3$ is hydrocarbyl. In some embodiments, $R_3$ is alkyl, alkenyl, alkynyl, cycloalkyl, alkaryl, aralkyl, or aryl. In some embodiments, one of $R_1$ and $R_2$ is hydrogen, and the other is hydrocarbyl. In some embodiments, $R_1$ and $R_2$ are the same. In some embodiments, $R_1$ and $R_2$ are each, independently, alkyl, alkenyl, alkynyl, cycloalkyl, aralkyl, alkaryl, or aryl. In some embodiments, $R_3$ is hydrocarbyl, and $R_1$ and $R_2$ are both hydrogen. In some embodiments, $R_3$ is hydrocarbyl, and one of $R_1$ and $R_2$ is hydrogen and the other is hydrocarbyl. In some embodiments, $R_1$ and $R_2$, together, form a ring of from about 3 to about 7 carbon atoms. In some embodiments, the proton acceptor has more than one —$NR_1R_2$ group.

In some embodiments, the proton acceptor is a primary amine. In some embodiments, the proton acceptor is a secondary amine. In some embodiments, the proton acceptor is a tertiary amine. In some embodiments, the proton acceptor is dimethyl amine, diethyl amine, dipropyl amine, n-butyl amine, tert-butyl amine, sec-butyl amine, di-n-butylamine, aniline, cyclohexylamine, cyclopentyl amine, or tert-amylamine. In some embodiments, the proton acceptor is trimethyl amine, triethylamine, tripropyl amine, or tributylamine. In some embodiments, the proton acceptor is n-butylamine, diethylamine, triethylamine, or tert-amylamine.

In some embodiments, the proton acceptor is an alcohol. In some embodiments, the proton acceptor is a compound of formula:

R—OH wherein R is aliphatic hydrocarbyl, such as alkyl, which may be substituted, for example, with an aromatic moiety, such as aralkyl. In some embodiments, the —OH is attached to a primary, secondary, or tertiary carbon. In some embodiments, the —OH is attached to a primary carbon. In some embodiments, the —OH is attached to a secondary carbon. In some embodiments, the —OH is attached to a tertiary carbon. In some embodiments, R is alkyl, alkenyl, alkynyl, or aralkyl. In some embodiments, the proton acceptor has more than one —OH group.

In some embodiments, the alcohol is methanol, ethanol, 1-propanol, isopropanol, 1-butanol, 2-butanol, tert-butanol, cyclohexanol, or cyclopentanol. In some embodiments, the alcohol is methanol, ethanol, or isopropanol.

In some embodiments, the proton acceptor may be a phenol or phenol derivative.

4.4 Diluents

In some embodiments of the methods described herein, the methods are performed in a diluent. In some embodiments, the diluent is a single compound or a mixture of two or more compounds. In some embodiments, the diluent completely dissolves the reaction components or partially dissolves the reaction components. In some embodiments, the diluent completely or nearly completely dissolves the reaction components. In some embodiments, the diluent completely dissolves the reaction components. In some embodiments, the diluent nearly completely dissolves the reaction components.

In some embodiments, the diluent has a low boiling point and/or low freezing point. In some embodiments, the diluent is an alkane, an alkyl monohalide, or an alkyl polyhalide. In some embodiments, the diluent is a normal alkane. In some embodiments, the diluent is propane, normal butane, normal pentane, normal hexane, normal heptane, normal octane, normal nonane or normal decane. In some embodiments, the diluent is a branched alkane. In some embodiments, the alkane is isobutane, isopentane, neopentane, isohexane, 3-methylpentane, 2,2-dimethylbutane, or 2,3-dimethylbutane.

In some embodiments, the diluent is a halogenated alkane. In some embodiments, the diluent is chloroform, ethylchloride, n-butyl chloride, methylene chloride, methyl chloride, 1,2-dichloroethane, 1,1,2,2-tetrachloroethane, carbon tetrachloride, 1,1-dichloroethane, n-propyl chloride, iso-propyl chloride, 1,2-dichloropropane, or 1,3-dichloropropane. In some embodiments, the diluent is an alkene or halogenated alkene. In some embodiments, the diluent is vinyl chloride, 1,1-dichloroethene, or 1,2-dichloroethene.

In some embodiments, the diluent is a substituted benzene.

In some embodiments, the diluent is carbon disulfide, sulfur dioxide, acetic anhydride, acetonitrile, benzene, toluene, ethylbenzene methylcyclohexane, chlorobenzene, or a nitroalkanes. In some embodiments, the diluent is a mixture of the compounds in this paragraph.

In some embodiments, the diluent is a mixture of hexane and methyl chloride. In some embodiments, such mixture is from about 10/90 to about 90/10 hexane/methyl chloride by volume. In some embodiments, such mixture is from about 30/70 to about 70/30 hexane/methyl chloride by volume. In some embodiments, such mixture is from about 50/50 to about 100/0 hexane/methyl chloride by volume. In some embodiments, such mixture is from about 50/50 to about 70/30 hexane/methyl chloride by volume. In some embodiments, such mixture is about 60/40 hexane/methyl chloride by volume. In some embodiments, such mixture is about 50/50 hexane/methyl chloride by volume.

4.5 Temperature

In some embodiments, the methods described herein are performed at a temperature from about −120° C. to about 0° C. In some embodiments, the methods described herein are performed at a temperature from about −110° C. to about −10° C. In some embodiments, the methods described herein are performed at a temperature from about −100° C. to about −20° C. In some embodiments, the methods described herein are performed at a temperature from about −90° C. to about −30° C. In some embodiments, the methods described herein are performed at a temperature from about −80° C. to about −40° C. In some embodiments, the methods described herein are performed at a temperature from about −70° C. to about −40° C. In some embodiments, the methods described herein are performed at a temperature from about −60° C. to about −40° C. In some embodiments, the methods described herein are performed at a temperature of −40° C., −45° C., −60° C., or −80° C. In some embodiments, the methods described herein are performed at a temperature of −40° C. In some embodiments, the methods described herein are performed at a temperature of −45° C. In some embodiments, the methods described herein are performed at a temperature of −60° C. In some embodiments, the methods described herein are performed at a temperature of −80° C.

4.6 Concentrations

In some embodiments, the ratio of the molar concentration between dihydrocarbylmonosulfides to chain ends is from about 0.2- to about 5. In some embodiments, the ratio of the molar concentration between dihydrocarbylmonosulfides to chain ends is from about 0.5- to about 5. In some embodiments, the ratio of the molar concentration between dihydrocarbylmonosulfides to chain ends is from about 0.5- to about 2. In some embodiments, the ratio of the molar concentration between dihydrocarbylmonosulfides to chain ends is from about 0.7- to about 1.5. In some embodiments, the ratio of the molar concentration between dihydrocarbylmonosulfides to chain ends is from about 0.9- to about 1.4. In some embodiments, the ratio of the molar concentration between dihydrocarbylmonosulfides to chain ends is from about 1.0- to about 1.2. In some embodiments, the ratio of the molar concentration between dihydrocarbylmonosulfides to chain ends is about 1.0.

The chain end concentration of the methods described herein are not limited by the disclosed examples. The chain end concentration for the methods described herein appears to have no upper limit, and the methods described herein may be performed at any chain end concentration. In some embodiments, the electron donor concentration is less than half the concentration of Lewis acid. In some embodiments, the electron donor concentration is less than 0.4 times the Lewis acid concentration. In some embodiments, the electron donor concentration is less than 0.3 times the Lewis acid concentration. In some embodiments, the electron donor concentration is less than 0.2 times the Lewis acid concentration. In some embodiments, the electron donor concentration is less than 0.1 times the Lewis acid concentration.

In some embodiments, the chain end concentration is less than 0.010 M. In some embodiments, the chain end concentration is less than 0.050 M. In some embodiments, the chain end concentration is less than 0.10 M. In some embodiments, the chain end concentration is less than 0.5 M. In some embodiments, the chain end concentration is less than 1.0 M. In some embodiments, the chain end concentration is greater than 0.001 M.

4.7 Exo-Selectivity

In some embodiments, the methods described herein selectively provide vinylidene terminated polyolefins. In some embodiments, vinylidene terminated polyolefin, polyolefins containing endo olefins, tert-halide polyolefins, and coupled polyolefins are reaction products. In some embodiments, the vinylidene terminated polyolefin is the major product, and polyolefins containing endo olefins, tert-halide polyolefins, and coupled polyolefins are the minor products.

In some embodiments, the vinylidene terminated polyolefin formed is at least 40 percent by mole of all products. In some embodiments, the vinylidene terminated polyolefin formed is at least 50 percent by mole of all products. In some embodiments, the vinylidene terminated polyolefin formed is at least 60 percent by mole of all products. In some embodiments, the vinylidene terminated polyolefin formed is at least 70 percent by mole of all products. In some embodiments, the vinylidene terminated polyolefin formed is at least 80 percent by mole of all products. In some embodiments, the vinylidene terminated polyolefin formed is at least 85 percent by mole of all products. In some embodiments, the vinylidene terminated polyolefin formed is at least 90 percent by mole of all products. In some embodiments, the vinylidene terminated polyolefin formed is at least 94 percent by mole of all products.

5. EXAMPLES

Certain embodiments provided herein are illustrated by the following non-limiting examples. Unless expressly stated in the contrary, all temperatures and temperatures ranges refer to the Centigrade system and the term "ambient" or "room temperature" refers to about 20 to 25° C.

5.1 Examples 1-5

A four-neck 250 milliliter round-bottom flask was equipped with an overhead mechanical stirrer and platinum resistance thermometer. This assembly was immersed into a heptane bath at −60° C. under dry nitrogen gas in a substantially inert atmosphere glovebox. The flask was then charged with the following reactants: 108 milliliters hexane equilibrated at −60° C., 72 milliliters methylchloride equilibrated at −60° C., 0.48 milliliters 2-chloro-2,4,4-trimethylpentane equilibrated at room temperature, 0.23 milliliters 2,6-dimethylpyridine equilibrated at room temperature, and 6.4 milliliters of isobutylene equilibrated at −60° C.

Then, the contents of the round-bottom flask were equilibrated at −60° C.

With continued stirring, next 0.87 milliliters titanium tetrachloride was charged to the flask. The reaction was allowed to proceed 12 minutes and then 20 milliliters of the polymerization solution was charged to seven 60 milliliter test tubes, equipped with threaded caps, immersed in the heptane bath maintained at −60° C.

The polymerization was allowed to continue in each test tube for 13 additional minutes (25 total reaction minutes) at which point 1 of the 7 tubes was terminated with 5 milliliters of methanol to provide a comparative example prior to addition of diethyldisulfide. Immediately after completing the comparative example, 0.52 g of diethylsulfide was added to one of the remaining test tubes containing a reactive polymerization, while other sulfide quenching agents were added to 4 of the remaining test tubes. The diethylsulfide quenching reaction (and other quenching reactions) was allowed to proceed 30 minutes at which time 5 milliliters of methanol was charged in order to terminate the quenching reaction. The final polymerization test tube was then terminated with 5 milliliters of methanol to provide a final comparative example (Control A). Non-quencher-containing reactions were used to provide a comparative baseline for the quenching reactions and to provide references for structural and molecular weight characterization in the absence of a quenching agent. The reactant quantities for Examples 1-5 and Control A are listed in Table 1. Results are shown in Table III (infra).

TABLE I

| Example | Sulfide | Sulfide(g) |
|---|---|---|
| 1 | diethylsulfide | 0.052 |
| 2 | dipropylsulfide | 0.069 |
| 3 | diisopropylsulfide | 0.069 |
| 4 | diallylsulfide | 0.066 |
| 5 | diisoamylsulfide | 0.101 |
| Control A | None | 0 |

Examples 6-11

Preparation of Polyisobutylene Using a Mono-Functional Initiator, Diisopropylsulfide and Different Reaction Terminators A four-neck 250 milliliter round-bottom flask was equipped with an overhead mechanical stirrer and platinum resistance thermometer. This assembly was immersed into a heptane bath at −60° C. under dry nitrogen gas in a substantially inert atmosphere glovebox. The flask was then charged with the following reactants:

165.2 milliliters hexane equilibrated at −60° C., 110.1 milliliters methylchloride equilibrated at −60° C., 1.06 milliliters 2-chloro-2,4,4-trimethylpentane equilibrated at room temperature, 0.35 milliliters 2,6-dimethylpyridine equilibrated at room temperature, and 19.9 milliliters of isobutylene equilibrated at −60° C.

Then, the contents of the round-bottom flask were equilibrated at −60° C.

With continued stirring, next 3.42 milliliters titanium tetrachloride was charged to the flask. The reaction was allowed to proceed 17 minutes and then 1.36 milliliters of diisopropylsulfide was charged to the reaction. After 30 seconds, 35 milliliters of the polymerization solution was charged to six 60 milliliter test tubes, equipped with threaded caps, immersed in the heptane bath maintained at −60° C.

The quenching reactions were allowed to react for 17 minutes, at which time the proton acceptors were charged individually to each tube. Three minutes were required to complete the termination of all reactions.

The reactant quantities for Examples 6-11 are listed in Table II. Results are shown in Table III (infra).

TABLE II

| Example | Proton Acceptor | Proton Acceptor (ml) |
|---------|-----------------|----------------------|
| 6  | Methanol      | 1.76 |
| 7  | Ethanol       | 2.55 |
| 8  | Isopropanol   | 3.34 |
| 9  | Diethylamine  | 3.99 |
| 10 | n-butylamine  | 4.53 |
| 11 | Tert-amylamine| 5.10 |

5.2 Example 12

Preparation of Polyisobutylene Using a Mono-Functional Initiator, Diisopropylsulfide A four-neck 250 milliliter round-bottom flask was equipped with an overhead mechanical stirrer and platinum resistance thermometer. This assembly was immersed into a heptane bath at −60° C. under dry nitrogen gas in a substantially inert atmosphere glovebox. The flask was then charged with the following reactants:

85.2 milliliters hexane equilibrated at −60° C., 78.6 milliliters methylchloride equilibrated at −60° C., 1.75 g 2-chloro-2,4,4-trimethylpentane equilibrated at room temperature, 0.23 milliliters 2,6-dimethylpyridine equilibrated at room temperature, and 32.7 milliliters of isobutylene equilibrated at −60° C.

Then, the contents of the round-bottom flask were equilibrated at −60° C.

With continued stirring, next 1.29 milliliters titanium tetrachloride was charged to the flask. The reaction was allowed to proceed 29 minutes at which time a 2 ml aliquot was removed from the reactor and charged to a vial containing 5 ml prechilled methanol to provide a comparative example prior to the addition of the sulfide. Then 1.69 ml of diisopropylsulfide was charged to the reaction. After 5 minutes, 4.5 ml of $TiCl_4$ was charged to the reactor. The mixture was stirred for 10 minutes at which time 30.52 ml of pre-chilled n-butylamine was charged to the reactor slowly over a 5 minute period. Finally, 25 ml pre-chilled methanol was charged to the reactor 5 minutes after the addition of n-butylamine. Results are shown in Table III (infra).

5.3 Example 13

Preparation of Polyisobutylene Using a Mono-Functional Initiator, Diisopropylsulfide A four-neck 250 milliliter round-bottom flask was equipped with an overhead mechanical stirrer and platinum resistance thermometer. This assembly was immersed into a heptane bath at −40° C. under dry nitrogen gas in a substantially inert atmosphere glovebox. The flask was then charged with the following reactants:

83.4 milliliters hexane equilibrated at −40° C., 78.1 milliliters methylchloride equilibrated at −40° C., 1.75 g 2-chloro-2,4,4-trimethylpentane equilibrated at room temperature, 0.23 milliliters 2,6-dimethylpyridine equilibrated at room temperature, and 33.8 milliliters of isobutylene equilibrated at −40° C.

Then, the contents of the round-bottom flask were equilibrated at −40° C.

With continued stirring, next 2.58 milliliters titanium tetrachloride was charged to the flask. The reaction was allowed to proceed 20 minutes at which time a 2 ml aliquot was removed from the reactor and charged to a vial containing 5 ml prechilled methanol to provide a comparative example prior to the addition of the sulfide. Then 1.69 ml of diisopropylsulfide was charged to the reaction. After 5 minutes, 1.13 ml of $TiCl_4$ was charged to the reactor. The mixture was stirred for 10 minutes at which time 29.65 ml of pre-chilled n-butylamine was charged to the reactor slowly over a 5 minute period. Finally, 25 ml pre-chilled methanol was charged to the reactor 5 minutes after the addition of n-butylamine. Results are shown in Table III (infra).

5.4 Example 14

Preparation of Polyisobutylene Using a Mono-Functional Initiator, Diisopropylsulfide A four-neck 250 milliliter round-bottom flask was equipped with an overhead mechanical stirrer and platinum resistance thermometer. This assembly was immersed into a heptane bath at −80° C. under dry nitrogen gas in a substantially inert atmosphere glovebox. The flask was then charged with the following reactants:

87.0 milliliters hexane equilibrated at −80° C., 79.1 milliliters methylchloride equilibrated at −80° C., 1.75 g 2-chloro-2,4,4-trimethylpentane equilibrated at room temperature, 0.12 milliliters 2,6-dimethylpyridine equilibrated at room temperature, and 31.6 milliliters of isobutylene equilibrated at −80° C.

Then, the contents of the round-bottom flask were equilibrated at −80° C.

With continued stirring, next 0.26 milliliters titanium tetrachloride was charged to the flask. The reaction was allowed to proceed 45 minutes at which time a 2 ml aliquot was removed from the reactor and charged to a vial containing 5 ml prechilled methanol to provide a comparative example prior to the addition of the sulfide. Then 1.69 ml of diisopropylsulfide was charged to the reaction. After 5 minutes, 3.2 ml of $TiCl_4$ was charged to the reactor. The mixture was stirred for 10 minutes at which time 25.4 ml of pre-chilled n-buty-

5.5 Example 15

Preparation of Polyisobutylene Using a Mono-Functional Initiator, Diisopropylsulfide A four-neck 250 milliliter round-bottom flask was equipped with an overhead mechanical stirrer and platinum resistance thermometer. This assembly was immersed into a heptane bath at −45° C. under dry nitrogen gas in a substantially inert atmosphere glovebox. The flask was then charged with the following reactants:

84.7 milliliters hexane equilibrated at −45° C.,
78.8 milliliters methylchloride equilibrated at −45° C.,
1.75 g 2-chloro-2,4,4-trimethylpentane equilibrated at room temperature,
0.092 milliliters 2,6-dimethylpyridine equilibrated at room temperature, and
33.5 milliliters of isobutylene equilibrated at −45° C.

Then, the contents of the round-bottom flask were equilibrated at −45° C.

With continued stirring, next 0.97 milliliters titanium tetrachloride was charged to the flask. The reaction was allowed to proceed 50 minutes at which time a 2 ml aliquot was removed from the reactor and charged to a vial containing 5 ml prechilled methanol to provide a comparative example prior to the addition of the sulfide. Then 1.64 ml of diisopropylsulfide was charged to the reaction. After 20 minutes, 1.5 ml of TiCl$_4$ was charged to the reactor. The mixture was stirred for 10 minutes at which time 20.3 ml of pre-chilled n-butylamine was charged to the reactor slowly over a 5 minute period. Finally, 25 ml pre-chilled methanol was charged to the reactor 5 minutes after the addition of n-butylamine. Results are shown in Table III (infra).

5.6 Example 16

Preparation of Polyisobutylene Using a Mono-Functional Initiator, Diisopropylsulfide A four-neck 250 milliliter round-bottom flask was equipped with an overhead mechanical stirrer and platinum resistance thermometer. This assembly was immersed into a heptane bath at −45° C. under dry nitrogen gas in a substantially inert atmosphere glovebox. The flask was then charged with the following reactants:

75.2 milliliters hexane equilibrated at −45° C.,
70.2 milliliters methylchloride equilibrated at −45° C.,
3.24 g 2-chloro-2,4,4-trimethylpentane equilibrated at room temperature,
0.13 g tetrabutylammonium chloride,
0.094 milliliters 2,6-dimethylpyridine equilibrated at room temperature, and
30.1 milliliters of isobutylene equilibrated at −45° C.

Then, the contents of the round-bottom flask were equilibrated at −45° C.

With continued stirring, next 0.6 milliliters titanium tetrachloride was charged to the flask. The reaction was allowed to proceed 55 minutes at which time a 2 ml aliquot was removed from the reactor and charged to a vial containing 5 ml pre-chilled methanol to provide a comparative example prior to the addition of the sulfide. Then 3.29 ml of diisopropylsulfide was charged to the reaction. After 1 minute, 3.88 ml of TiCl$_4$ was charged to the reactor. The mixture was stirred for 5 minutes at which time 13 ml of pre-chilled n-butylamine was charged to the reactor slowly over a 5 minute period. Finally, 10 ml pre-chilled methanol was charged to the reactor 5 minutes after the addition of n-butylamine. Results are shown in Table III (infra).

5.7 Procedure for Collecting $^1$H NMR Data $^1$H NMR spectra were collected using a Varian (300 MHz) spectrophotometer using samples concentrations of 3 percent to 5 percent (weight/weight) in CDCl$_3$. $^1$H NMR spectra were used for analysis of the end groups. Fractions of exo-olefin, endo-olefin, tert-chloride and coupled olefin chain ends were obtained using $^1$H NMR integration as described in a subsequent section.

5.7.1 Procedure for Calculating the Fractional Amounts of Chain Ends on the Polyisobutylene Product The fractions of exo-olefin, endo-olefin, and tert-chloride chain ends, and coupled products in the polyisobutylene samples were quantified using $^1$H NMR integration. It was assumed that these four species represent 100 percent of the chain ends. In some instances coupled products were deemed to be absent by qualitative inspection of the $^1$H NMR spectrum, and by confirming the absence of a shoulder on the low elution volume side of the main polymer peak in the GPC chromatogram. Two procedures are given below. The "General Procedure" was used when coupled product was detected; the "Special Procedure" was used when coupled product was deemed to be absent.

(a) General Procedure

The fractional molar amount of each type of chain end was obtained using an equation analogous to the equation given below for determining the fractional amount of exo-olefin, $$F(\text{exo}) = (A_{exo})/(A_{exo} + A_{endo} + A_{tert-Cl} + 2A_{coupled}) \quad (1)$$

where $A_{endo}$ is the area of the single olefinic resonance at 5.15 ppm, $A_{exo}$ is the area of the exo-olefinic resonance 4.63 ppm, and $A_{tert-Cl}$ was calculated as follows:

$$A_{tert-Cl} = (A_{16.5-1.72}/6) - A_{endo} \quad (2)$$

where $A_{1.65-1.72}$ is the integrated area of the convoluted peaks associated with the gem-dimethyl protons of the endo-olefin and the tert-chloride chain ends. It will be noted that a co-efficient of 2 appears in equation (1) for coupled product, to account for the fact that creation of these products consumes 2 polyisobutylene chains. $A_{coupled}$ was calculated as follows:

$$A_{coupled} = (A_{5.0-4.75} - A_{4.5-4.75})/2 \quad (3)$$

where $A_{5.0-4.75}$ is the integrated area of the convoluted peaks associated with one of the exo-olefin protons and the two identical protons of the coupled product, and where $A_{4.5-4.75}$ is the integrated area of the peak associated with the other exo-olefin proton.

(b) Special Procedure

In the qualitative absence of coupled product, the fractional molar amount of each type of chain end was obtained using an equation analogous to the equation given below for determining the fractional amount of exo-olefin, $$F(\text{exo}) = (A_{exo})/(A_{exo} + A_{endo} + A_{tert-Cl}) \quad (1)$$

where $A_{endo}$ is the area of the single olefinic resonance at 5.15 ppm, $A_{exo}$ is the average area of the two exo-olefinic resonances at 4.63 and 4.85 parts per million, and $A_{tert-Cl}$ was calculated in the same manner as described in the "General Procedure".

TABLE III

Molar Composition of Chain Ends after Quenching Reaction

| Ex. | Sulfide | Terminator/Proton Acceptor | Exo-Olefin (mole %) | Endo-Olefin (mole %) | Tert-Cl (mole %) | Coupled (mole %) | Other |
|---|---|---|---|---|---|---|---|
| 1 | diethylsulfide | Methanol | 39 | 6 | 50 | 0 | 5 |
| 2 | dipropylsulfide | Methanol | 24 | 4 | 69 | 0 | 2 |
| 3 | diisopropylsulfide | Methanol | 94 | 2 | 1 | 0 | 3 |
| 4 | diallylsulfide | Methanol | 43 | 5 | 45 | 0 | 6 |
| 5 | diisoamylsulfide | Methanol | 28 | 3 | 67 | 0 | 1 |
| A | none | Methanol | 4 | 1 | 94 | 1 | 0 |
| 6 | diisopropylsulfide | Methanol | 88 | 3 | 1 | 3 | 5 |
| 7 | diisopropylsulfide | Ethanol | 90 | 3 | 3 | 3 | 1 |
| 8 | diisopropylsulfide | Isopropanol | 91 | 3 | 3 | 3 | 0 |
| 9 | diisopropylsulfide | Diethylamine | 90 | 3 | 4 | 3 | 0 |
| 10 | diisopropylsulfide | n-butylamine | 88 | 3 | 5 | 4 | 0 |
| 11 | diisopropylsulfide | Tert-amylamine | 93 | 3 | 1 | 2 | 0 |
| 12 | diisopropylsulfide | n-butylamine | 90 | 4 | 2 | 4 | 0.0 |
| 13 | diisopropylsulfides | n-butylamine | 73 | 12 | 13 | <2 | 0.0 |
| 14 | diisopropylsulfide | n-butylamine | 79 | <2 | <1 | 19 | 0.0 |
| 15 | diisopropylsulfide | n-butylamine | 73 | 7 | 19 | <1 | 0.0 |
| 16 | diisopropylsulfide | n-butylamine | 88 | 4 | 6 | <2 | 0.0 |

The embodiments and examples described above are intended to be merely exemplary, and such examples and embodiments are non-limiting. One of ordinary skill in the art will recognize, or will be able to ascertain using no more than routine experimentation, modifications of the embodiments and examples described herein. Such modifications are considered to be within the scope of the claimed subject matter and are encompassed by the appended claims.

What is claimed is:

1. A method for preparing a vinylidene terminated polyolefin comprising:
   (a) generating an ionized polyolefin in the presence of a Lewis acid;
   (b) reacting the ionized polyolefin from step (a) with one or more dihydrocarbylmonosulfides having the following formula:

wherein $R_1$ and $R_2$ are each, independently, hydrocarbyl, wherein the dihydrocarbylmonosulfides are added to the polymer after polymerization has occurred; and
   (c) reacting the product of step (b) with one or more proton acceptor compounds;
   wherein a vinylidene terminated polyolefin is formed and the vinylidene terminated polyolefin formed is at least 40 percent by mole of all products;
   wherein the method is performed at a temperature from about −120° C. to about 0° C.

2. The method of claim 1, wherein $R_1$ and $R_2$ are each, independently, alkyl, alkenyl, alkynyl, aryl, alkaryl, aralkyl, or cycloalkyl.

3. The method of claim 1, wherein the one or more dihydrocarbylmonosulfides are diethylsulfide, dipropylsulfide, diisopropylsulfide, diallylsulfide, or diisoamylsulfide.

4. The method of claim 1, wherein the one or more dihydrocarbylmonosulfides are diisopropylsulfide.

5. The method of claim 1, wherein one dihydrocarbylmonosulfide is used.

6. The method of claim 1, wherein the proton acceptor is an alcohol or amine.

7. The method of claim 1, wherein the proton acceptor is an alcohol.

8. The method of claim 1, wherein the proton acceptor is methanol, ethanol, or isopropanol.

9. The method of claim 1, wherein the ionized polyolefin generated in step (a) is a quasiliving carbocationic polyolefin and the method is performed under quasiliving polymerization conditions.

10. The method of claim 9, wherein the quasiliving carbocationic polyolefin is prepared by adding a Lewis acid and a monomer to an initiator in the presence of an electron donor, common ion salt, or common ion salt precursor.

11. The method of claim 10, wherein the Lewis acid is a titanium tetrahalide, a boron trihalide, aluminum trichloride, tin tetrachloride, zinc chloride, or ethyl aluminum dichloride, or a mixture mixtures thereof.

12. The method of claim 10, wherein the Lewis acid is a titanium tetrahalide.

13. The method of claim 10, wherein the Lewis acid is titanium tetrachloride.

14. The method of claim 10, wherein a mixture of Lewis acids is used.

15. The method of claim 10, wherein the initiator is monofunctional.

16. The method of claim 10, wherein the initiator is 2-chloro-2-phenylpropane, 2-acetyl-2-phenylpropane, 2-propionyl-2-phenylpropane, 2-methoxy-2-phenylpropane, 2-ethoxy-2-phenylpropane, 2-chloro-2,4,4-trimethylpentane, 2-acetyl-2,4,4-trimethylpentane, 2-propionyl-2,4,4-trimethylpentane, 2-methoxy-2,4,4-trimethylpentane, or 2-ethoxy-2,4,4-trimethylpentane.

17. The method of claim 10, wherein the initiator is 2-chloro-2,4,4-trimethylpentane.

18. The method of claim 10, wherein the quasiliving carbocationic polyolefin is prepared from more than one monomer.

19. The method of claim 10, wherein the monomer is isobutylene, 2-methyl-1-butene, 3-methyl-1-butene, or 4-methyl-1-pentene.

20. The method of claim 10, wherein the monomer is isobutylene.

21. The method of claim 10, wherein the electron donor is a compound of the formula:

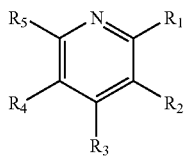

wherein $R_1$, $R_2$, $R_3$, $R_4$, and $R_5$ are each, independently, hydrogen or hydrocarbyl; or $R_1$ and $R_2$, or $R_2$ and $R_3$, or $R_3$ and $R_4$, or $R_4$ and $R_5$ independently form a fused aliphatic ring of about 3 to about 7 carbon atoms or a fused aromatic ring of about 5 to about 7 carbon atoms.

22. The method of claim 10, wherein the common ion salt precursor is tetra-n-butylammonium chloride or tetra-n-butylammonium iodide.

23. The method of claim 1, wherein the method is performed in the presence of pyridine or a pyridine derivative.

24. The method of claim 23, wherein the pyridine derivative is 2,6-lutidine.

25. The method of claim 1, wherein the method is performed in the presence of an amide.

26. The method of claim 25, wherein the amide is dimethylformamide.

27. The method of claim 1, wherein the method is performed in the presence of a common ion salt or common ion salt precursor.

28. The method of claim 27, wherein the common ion salt precursor is tetrabutylammonium chloride or tetrabutylammonium iodide.

29. The method of claim 1, wherein the method is performed at a temperature from about −60° C. to about −40° C.

30. The method of claim 1, wherein the one or more dihydrocarbylmonosulfides are present at a concentration of from about 0.5 to about 3 times chain end concentration.

31. The method of claim 1, wherein the one or more dihydrocarbylmonosulfides are present at a concentration from about 1 to about 1.2 times chain end concentration.

32. The method of claim 1, wherein a diluent is used.

33. The method of claim 32, wherein the diluent is a mixture of two or more compounds.

34. The method of claim 32, wherein the diluent is a mixture of methyl chloride and hexane.

35. The method of claim 34, wherein the mixture is from about 10/90 to about 90/10 hexane/methyl chloride by volume.

36. The method of claim 1, wherein the vinylidene terminated polyolefin formed is at least 60 percent by mole of all products.

37. The method of claim 1, wherein the vinylidene terminated polyolefin formed is at least 70 percent by mole of all products.

38. The method of claim 1, wherein the vinylidene terminated polyolefin formed is at least 80 percent by mole of all products.

39. The method of claim 1, wherein the vinylidene terminated polyolefin formed is at least 85 percent by mole of all products.

40. The method of claim 1, wherein the vinylidene terminated polyolefin formed is at least 90 percent by mole of all products.

41. The method of claim 1, wherein the vinylidene terminated polyolefin formed is at least 94 percent by mole of all products.

42. The method of claim 10, wherein the vinylidene terminated polymer formed is at least 70 percent by mole of all products.

43. The method of claim 10, wherein the vinylidene terminated polyolefin formed is at least 85 percent by mole of all products.

44. The method of claim 1, wherein the ratio of the molar concentration of dihydrocarbylmonosulfide to the molar concentration of chain ends of the ionized polyolefin is from about 1.0 to about 1.2.

* * * * *